(12) United States Patent
Akhtar

(10) Patent No.: US 9,866,647 B2
(45) Date of Patent: Jan. 9, 2018

(54) HIERARCHICAL COST BASED CACHING FOR ONLINE MEDIA

(71) Applicant: Alcatel-Lucent USA Inc., Murray Hill, NJ (US)

(72) Inventor: Shahid Akhtar, Richardson, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 349 days.

(21) Appl. No.: 14/669,408

(22) Filed: Mar. 26, 2015

(65) Prior Publication Data

US 2016/0285996 A1 Sep. 29, 2016

(51) Int. Cl.

| | |
|---|---|
| *H04L 29/08* | (2006.01) |
| *G06F 12/08* | (2016.01) |
| *G06F 12/12* | (2016.01) |
| *G06F 12/0811* | (2016.01) |
| *G06F 12/0871* | (2016.01) |

(Continued)

(52) U.S. Cl.
CPC ...... *H04L 67/2852* (2013.01); *G06F 12/0811* (2013.01); *G06F 12/0871* (2013.01); *G06F 12/0888* (2013.01); *G06F 12/121* (2013.01); *H04L 67/1097* (2013.01); *G06F 12/123* (2013.01); *G06F 2212/1016* (2013.01); *G06F 2212/1024* (2013.01); *G06F 2212/1048* (2013.01); *G06F 2212/1056* (2013.01); *G06F 2212/165* (2013.01); *G06F 2212/263* (2013.01); *G06F 2212/284* (2013.01); *G06F 2212/464* (2013.01)

(58) Field of Classification Search
None
See application file for complete search history.

(56) References Cited

U.S. PATENT DOCUMENTS

| | | |
|---|---|---|
| 6,826,599 B1 | 11/2004 | Shaffer et al. |
| 2006/0090040 A1 | 4/2006 | Eschmann |

(Continued)

FOREIGN PATENT DOCUMENTS

EP 2830285 A1 1/2015

OTHER PUBLICATIONS

Prof. Ketan Shah et al., "An O(1) algorithm for implementing the LFU cache eviction scheme", Technical report, Aug. 16, 2010, pp. 1-8, <http://dhruvbird.com/lfu.odf>.

(Continued)

*Primary Examiner* — Azizul Choudhury
(74) *Attorney, Agent, or Firm* — Haress, Dickey & Pierce, P.L.C.

(57) ABSTRACT

A method of operating a first cache device may include receiving, at the first cache device, a request to send a first asset to a second device; determining whether the first asset is stored at the first cache device; and when the determining determines that the first asset is not stored at the first cache device, obtaining, at the first cache device, the first asset, comparing, at the first cache device, a moving average of a marginal value of the first asset with respect to the first cache device and a characteristic marginal value of the first cache device, calculating a cost associated with the first asset, selectively storing the first asset at the first cache device based on the comparison, and sending the obtained first asset and the calculated cost to the second device.

20 Claims, 5 Drawing Sheets

(51) Int. Cl.
  *G06F 12/0888* (2016.01)
  *G06F 12/121* (2016.01)
  *G06F 12/123* (2016.01)

(56) References Cited

U.S. PATENT DOCUMENTS

| | | |
|---|---|---|
| 2011/0107030 A1 | 5/2011 | Borst et al. |
| 2012/0054445 A1 | 3/2012 | Swart et al. |
| 2013/0268733 A1 | 10/2013 | Narayanan et al. |
| 2014/0280679 A1 | 9/2014 | Dey et al. |
| 2016/0014194 A1* | 1/2016 | Kaplinger ............... H04L 67/06 709/217 |

OTHER PUBLICATIONS

Athula Balachandran et al., "Analyzing the Potential Benefits of CDN Augmentation Strategies for Internet Video Workloads", in Proc. IMC, New York, NY, USA, 2013, pp. 43-56.
L. A. Belady, "A study of replacement algorithms for a virtual-storage computer", IBM Systems Journal, vol. 5, No. 2, 1966, pp. 78-101.
Dave Simpson, "MLC vs. SLC flash for enterprise SSDs", Jul. 2010, http://www.infostor.com/index/articles/display/1169849064/articles/infostor/disk-arrays/disk-drives/2010/july-2010/mlc-vs_slc_flash.html.
Gil Einziger et al., TinyLFU: A Highly Efficient Cache Admission Policy, Parallel, Distributed and Network-Based Processing (PDP), 2014 22nd Euromicro International Conference on IEEE, 2014.
Gerry Cole, Seagate Technology Paper TP-338.1: "Estimating Drive Reliability in Desktop Computers and Consumer Electronics Systems", Nov. 2000.
Hao Che et al., "Hierarchical Web Caching Systems: Modeling, Design and Experimental Results", IEEE Journal on Selected Areas in Communications, vol. 20, No. 7, pp. 1305-1314, Sep. 2002.
Hongliang Yu et al., "Understanding User Behavior in Large-Scale Video-on-Demand Systems", SIGOPS Oper. Syst. Rev., vol. 40, No. 4, pp. 333-344, Apr. 2006.
Configuring the Cache—Apache Traffic Server 4.0.x documentation, https://docs.trafficserver.apache.org/en/4.0.x/admin/configuring-cache.en.html, 2013.
Jaime Llorca et al., "Dynamic In-Network Caching for Energy Efficient Content Delivery", in Proc. IEEE INFOCOM, 2013, pp. 245-249.
K. Poularakis et al., "Optimal Algorithms for Hierarchical Web Caches", IEEE ICC 2013—Selected Areas inn Communications Symposium, Jun. 2013, pp. 4073-4077.
K. Poularakis et al., "Optimal cooperative content placement algorithms in hierarchical cache topologies", in Proc. Ann. Conf. on Inform. Sci. and Syst., Mar. 2012, pp. 1-6.
Kang-Won Lee et al., "Understanding the Potential Benefits of Cooperation among Proxies: Taxonomy and Analysis", IBM Research, Tech. rep. 2001.
Keqiu Li et al., "Optimal Methods for Coordinated Enroute Web Caching for Tree Networks", ACM Transactions on Internet Technology, vol. 5, No. 3, Aug. 2005, pp. 480-507.
Nikolaos Laoutaris et al., "The LCD interconnection of LRU caches and its analysis", Performance Evaluation 63.7, 2006, pp. 609-634.
Ludmila Cherkasova, "Improving WWW Proxies Performance with Greedy-Dual-Size-Frequency Caching Policy", HP Computer Systems Laboratory, Tech. rep., Nov. 1998.
Nikolaos Laoutaris et al., "Meta Algorithms for Hierarchical Web Caches", in Proc. IEEE IPCCC, 2004, pp. 445-452.
Pablo Rodriguez et al., "Analysis of Web Caching Architectures: Hierarchical and Distributed Caching", IEEE/ACM Transactions on Networking, vol. 9, pp. 404-418, Aug. 2001.
Pei Cao et al., "Cost-Aware WWW Proxy Caching Algorithms", in Proc. USENIX Symposium on Internet Technologies and Systems, Monterey, CA, Dec. 1997.
Sandvine Report, "Exposing the Technical and Commercial Factors Underlying Internet Quality of Experience", Sep. 2013.
Sem Borst et al., "Distributed Caching Algorithms for Content Distribution Networks", in Proc. IEEE INFOCOM, 2010.
Dimitrios Serpanos et al, "Exploitation of Different Types of Locality for Web Caches", work was done when author was at the Dept. of Computer Science, Princeton University, with support by NSF Career award NSF CCR-9502747, an Alfred Sloan Fellowship, and a Packard Fellowship, Computers and Communications, 2002.
Shahab Bakhtiyari, "Performance Evaluation of the Apache Traffic Server and Varnish Reverse Proxies", Network and System Administration, University of Oslo, May 23, 2012.
Stefan Podlipnig et al., "A Survey of Web Cache Replacement Strategies", ACM Computing Surveys, vol. 35, No. 4, Dec. 2003, pp. 374-398.
Wenting Tang et al., "Modeling and generating realistic streaming media server workloads", Computer Networks 51.1, 2007, pp. 336-356.
Yan Chen et al., "Efficient and Adaptive Web Replication Using Content Clustering", IEEE Journal on Selected Areas in Communications, vol. 21, No. 6, Aug. 2003, pp. 979-994.
International Search Report dated May 6, 2016 for International Application No. PCT/US2016/021421.

* cited by examiner

HIERARCHICAL COST BASED CACHING FOR ONLINE MEDIA

BACKGROUND

1. Field

Example embodiments relate generally to caching media, and particularly to providing hierarchical caching for online media.

2. Related Art

Online video is presently the largest component, or one of the largest components, of internet traffic. Caching such video adds additional requirements on traditional algorithms. For many conventional algorithms, hit-rate has traditionally been the key performance metric used to compare such algorithms. Increasingly newer caches use SSD memory for storage due to SSD memory's access speed and reliability. A lifetime of SSD memory may have a limited number of write cycles available. Replacement rate, or the number of write cycles per request is another key performance metric that may be of interest with such memory. According to some online video usage data, a significant part of the online video is used to rebroadcast recent TV shows which are initially quite popular but rapidly drop in popularity. Measuring the performance of caching algorithms with such rapid changes is another new performance metric. Typically online caching stores the video in small chunks of typically between 2 and 10 seconds. Further each video may be encoded into multiple video quality levels further increasing the number of chunks per video. In all, online video can increase the number of files that can be requested by end users in a caching system by a thousand fold or more.

Many conventional caching algorithms proposed in research over the last 30 years have not been implemented in commercial caches. For example, prominent examples of implemented schemes include simple schemes like the least recently used (LRU) and a few others like greedy dual size frequency (GDSF) and least frequently used with dynamic aging (LFU-DA).

Further, a size of a cache may be finite. Therefore, storage of a new asset may require the eviction of a stored asset. However, when determining which stored asset to evict, many conventional caching algorithms do not factor in the cost associated with re-obtaining each of the stored assets.

SUMMARY

Some example embodiments relate to a method of operating a cache device.

In some example embodiments, the method includes receiving, at the first cache device, a request to send a first asset to a second device; determining whether the first asset is stored at the first cache device; and when the determining determines that the first asset is not stored at the first cache device, obtaining, at the first cache device, the first asset, calculating a cost associated with the first asset, selectively storing the first asset at the first cache device based on a moving average of a marginal value of the first asset with respect to the first cache device and a characteristic marginal value of the first cache device, the characteristic marginal value of the first cache device representing a cost conscious average period of time between receipt of last requests for, and eviction of, assets cached at the first cache, and sending the obtained first asset and the calculated cost to the second device.

In some example embodiments, the first cache is one of a plurality of cache devices of a content distribution network divided into a plurality of hierarchy levels, and the method further includes, for each of the plurality of cache devices, determining a moving average of the marginal value of a requested asset, when a request for the requested asset is received by a respective one of the plurality of cache devices, and determining a characteristic marginal value associated with a respective one of the plurality of cache devices, when the cache device evicts an asset.

In some example embodiments, the obtaining obtains the first asset and an obtained cost associated therewith from a higher level of the plurality of hierarchy levels, and the calculating the cost includes adding a marginal cost to the obtained cost if the selectively storing does not store the first asset.

In some example embodiments, the method further includes determining the characteristic marginal value of the first cache device by, initializing the characteristic marginal value of the first cache device as a value which is higher than the initialized value of the moving average of the marginal value (MU) of the first asset with respect to the first cache device, and updating the characteristic marginal value of the first cache device based on exponentially weighted moving average of periods of time between receipt of last requests for, and eviction of, assets cached at the first cache device and the cost associated with the assets, in accordance with a least recently used cache eviction policy.

In some example embodiments, the updating the characteristic marginal value of the first cache device further includes, gently increasing the characteristic marginal value of the first cache device, when the first cache evicts an asset.

In some example embodiments, the method includes determining the moving average of the marginal value of the first asset with respect to the first cache device by, initializing the moving average of the marginal value of the first asset with respect to first cache device as a value lower than the initialized value of the characteristic marginal value of the first cache device, and updating the moving average of the marginal value of the first asset with respect to the first cache device based on exponentially weighted moving average of periods of time between consecutive receipts of requests for the first asset and the cost associated with the first asset, at the first cache device, the requests requesting the first cache device to send the first asset to another device.

In some example embodiments, the selectively storing includes, assigning the first asset to a first database, when an initial request for the first asset is received at the first cache device; and when a second request is received consecutively with respect to the initial request, determining an inter-arrival time of the first asset based on times at which the initial and second requests were received at the first cache device, and if a number of assets stored in an inter-arrival database is greater than or equal to a threshold then, determining a second asset to remove from an inter-arrival database based on which of a plurality of assets stored in the inter-arrival database has a largest marginal value associated therewith that decreases as the cost associated with the second asset increases, the inter-arrival time database storing arrival times of requests corresponding to assets, the inter-arrival time database being different than the first database, and removing the second asset from the inter-arrival database; and assigning the first asset to the inter-arrival time database.

In some example embodiments, the method further includes determining the marginal value of the assets by dividing a last requested time of each of the plurality of assets by the cost associated therewith.

According to one or more example embodiments, a first cache device may include a processor and a memory.

In some example embodiments, the memory may contains computer readable code that, when executed by the processor, configures the processor to, receive a request to send a first asset to a second device, determine whether the first asset is stored at the first cache device, and when the processor determines that the first asset is not stored at the first cache device, the processor is configured to, obtain, at the first cache device, the first asset, calculate a cost associated with the first asset, selectively store the first asset at the first cache device based on a moving average of a marginal value of the first asset with respect to the first cache device and a characteristic marginal value of the first cache device, the characteristic marginal value of the first cache device representing a cost conscious average period of time between receipt of last requests for, and eviction of, assets cached at the first cache, and send the obtained first asset and the calculated cost to the second device.

According to one or more example embodiments, a method of operating a content distribution network, the content distribution network including a plurality of first cache devices divided into a plurality of hierarchy levels, each of the plurality of first caches devices including a processor and a memory.

In some example embodiments, the memory may contain computer readable code that, when executed by a processor, configures the processor of a respective first cache device to, receive a request to send a first asset to a second device, determine whether the first asset is stored at the first cache device, and when the processor determines that the first asset is not stored at the first cache device, obtain, at the first cache device, the first asset, calculate a cost associated with the first asset, selectively store the first asset at the first cache device based on a moving average of a marginal value of the first asset with respect to the first cache device and a characteristic marginal value of the first cache device, the characteristic marginal value of the first cache device representing a cost conscious average period of time between receipt of last requests for, and eviction of, assets cached at the first cache, and send the obtained first asset to the second device.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1:
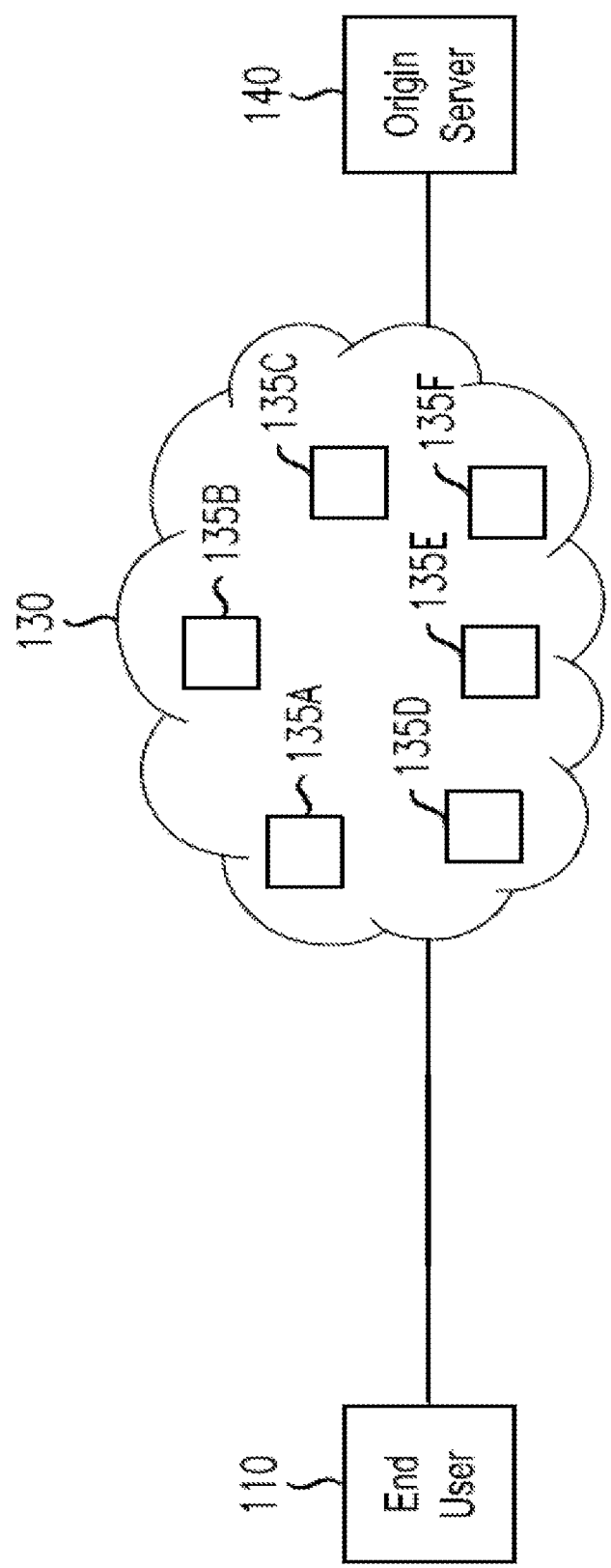
FIG. 1 is a diagram illustrating a portion of a data network according some example embodiments.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", an and the are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an eNB shown in FIG. 1). Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Example Network Architecture

FIG. 1 illustrates a portion of a data network 100 according to one or more example embodiments. Communications network 100 includes an end user 110, a content distribution network (CDN) 130 and an origin server 140.

The end user 110 may be embodied by, for example, an electronic user device. An electronic device may include a mobile device, smart phone, laptop, tablet, or a personal computer. The end user 110 is capable of receiving content stored at the origin server 140 via CDN 130. The end user 110, the CDN 130 and the origin server 140 may be connected to each other through, for example, the internet.

The CDN 130 includes caches 135A~F. Caches 135A~F each include storage for storing media content. Caches 135A-F may be embodied, together, in groups, or individually in, for example, servers, routers, or wireless communications network components including, for example, base stations (BSs), evolved node Bs (eNBs), or a radio network controllers (RNCs). Though CDN 130 is illustrated as only including six caches 135A~F, the CDN 130 may include any number of caches. Further, in the example illustrated in FIG. 1, the origin server 140 is separate from the CDN 130. However, according to one or more example embodiments, the origin server 140 may be considered part of the CDN 130.

The origin server 140 is a server that provides content in response to content requests. For example, the origin server 140 may store content corresponding to one or more videos which may be requested by the end user 110 for streaming. In this case, the origin server 140 may receive content requests associated with the particular videos, for example from a cache within the CDN 130, and the origin server 140 may respond to the requests by providing the requested content. Though, for the purpose of simplicity, only one origin server 140 is illustrated, data network 100 may include any number of origin servers.

Figure 2A:
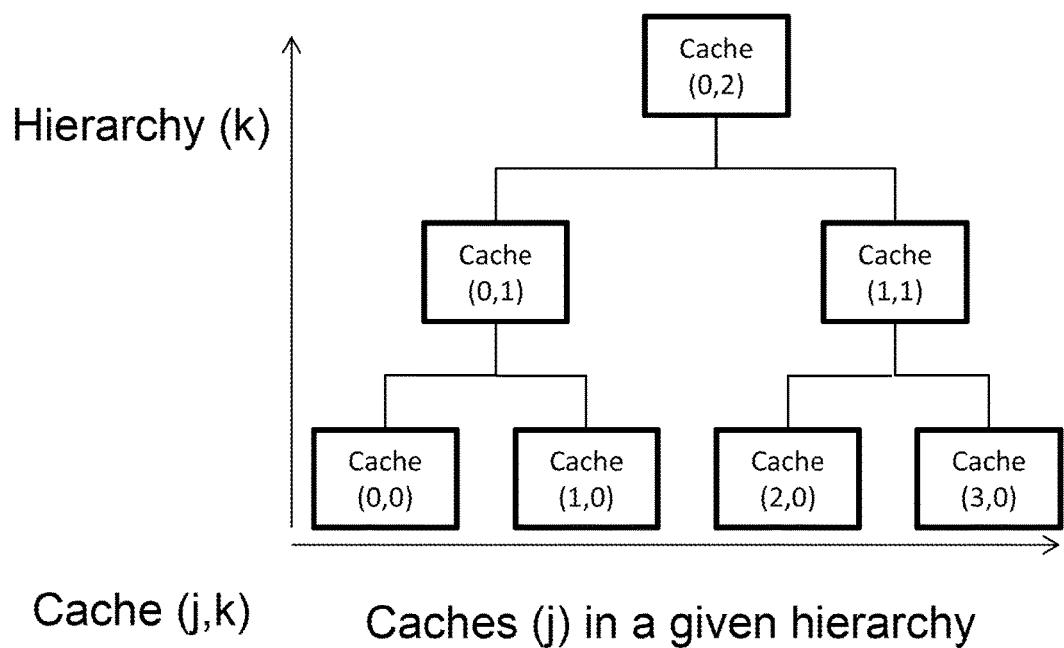
FIG. 2A is a diagram illustrating the organization of a hierarchical cache system.

The caches in the CDN 130 may be organized in a hierarchical cache structure. FIG. 2A is a diagram illustrating an example organization of a hierarchical cache system. As is illustrated in FIG. 2A, caches in a hierarchical cache system may be organized in a tree structure. Each cache in FIG. 2A has an index 'j' and a hierarchy level 'k' denoted by the coordinates (j,k). Accordingly, the lowest hierarchy level, k=0, includes four caches, cache (0,0), cache (1,0), cache (2,0), and cache (3,0). The next highest hierarchy level, k=1, includes 2 caches, cache (0,1), and cache (1,1). The highest hierarchy level, k=2, includes 1 cache, cache (0,2). Cache (0,2) may be the parent of cache (0,1) and cache (1,1). Cache (0,1) may be the parent of cache (0,0) and cache (1,0). Cache (1,1) may be the parent of cache (2,0) and cache (3,0). Every cache that has a parent cache is a child cache with respect to the parent cache. Further, caches in a hierarchical cache system that are not parent caches may be referred to as 'leaf' caches. For example, in the tree structure shown in FIG. 2A, the caches of hierarchy level k=0 (i.e., cache (0,0), cache (1,0), cache (2,0), and cache (3,0)) are examples of leaf caches. When a child cache in a hierarchical cache system experiences a cache miss with respect to a requested asset, the child cache may communicate with the parent cache of the child cache to determine whether or not the parent cache has the requested asset. If the parent cache does not have the requested asset, the parent cache may then communicate with a higher level cache or an origin server to obtain the requested asset, before providing the requested asset to the child cache.

As used herein, the term "asset" refers to data that may be stored in a cache or provided by an origin server, and may be requested by a user. For example, with respect to online video, an example of an asset is a 2-10 second chunk of video data stored at an origin server, that may be requested by a user and may be stored at one or more caches.

According to one or more example embodiments, the caches in the CDN 130 may be organized in the hierarchical cache structure shown in FIG. 2A. For example the caches 135A~F in FIG. 1 may correspond, respectively, to cache (0,2), cache (0,1), cache (1,1), cache (0,0), cache (1,0), and cache (2,0).

An example structure of the network elements of data network 100 will now be discussed below with reference to FIG. 2B.

Example Network Element Structure

Figure 2B:
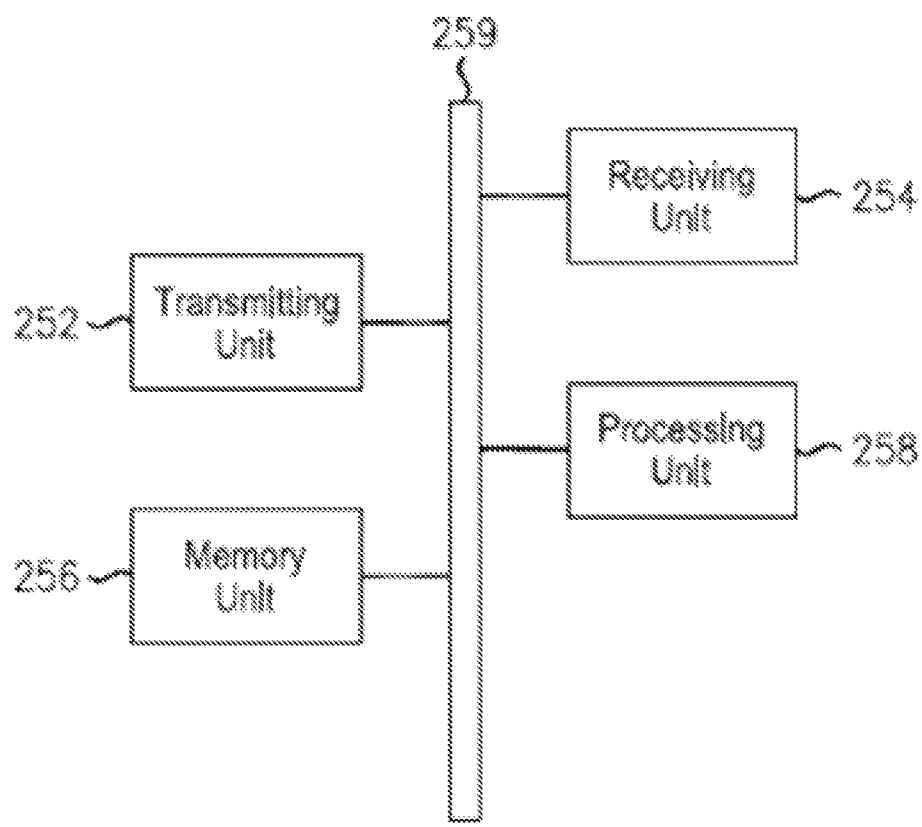
FIG. 2B is a diagram illustrating an example structure of a network element according to example embodiments.

FIG. 2B is a diagram illustrating an example structure of a network element 251. According to example embodiments, any or all network elements in the data network 100, including for example the end user 110, the caches 135A-F, and the origin server 140, may have the same structure and operation described below with respect to network element 251.

Referring to FIG. 2B, the network element 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to other network elements in data network 100.

The receiving unit 254 is a device that includes hardware and any necessary software for receiving wireless signals including, for example, control signals or data signals via one or more wired and/or wireless connections to other network elements in the data network 100.

The memory unit 256 may be any device capable of storing data including magnetic storage, flash storage, etc.

The processing unit 258 may be any device capable of processing data including, for example, a processor.

Figure 3:
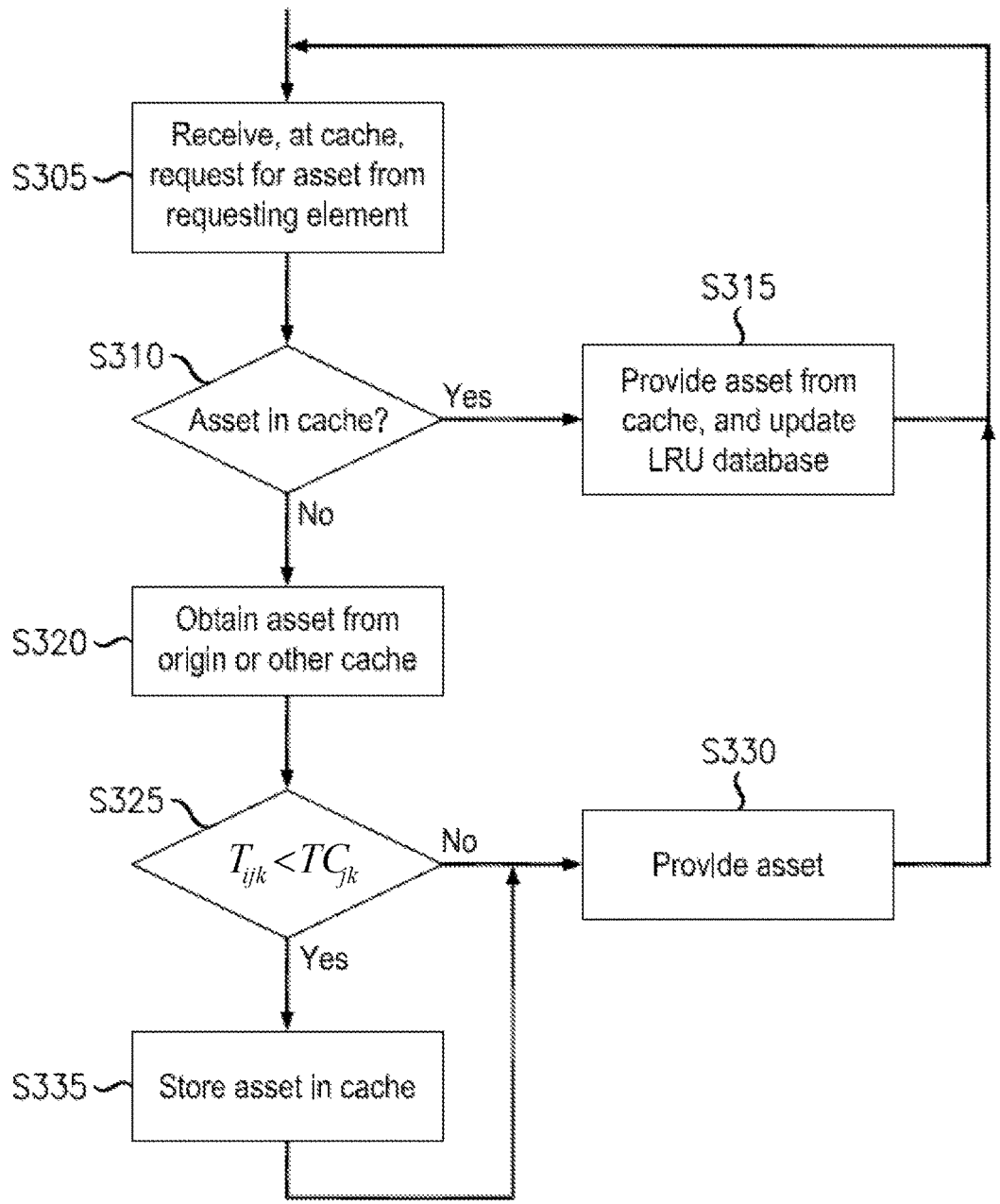
FIG. 3 is a flow chart illustrating an example method of operating a network element to perform hierarchical caching of online media according to some example embodiments.

According to at least one example embodiment, any operations described herein, for example with reference to any of FIGS. 1-3, as being performed by any one of a user (e.g., the end user 110), a cache (e.g., caches 135A-F), and a server (e.g., the origin server 140) may be performed by an electronic device having the structure of the network element 251 illustrated in FIG. 2B. For example, according to at least one example embodiment, the network element 251 may be programmed, in terms of software and/or hardware, to perform any or all of the functions described herein as being performed by a user, a cache, or server. Consequently, each of the end user 110, the caches and the servers described herein may be embodied as special purpose computers.

Examples of the network element 251 being programmed, in terms of software, to perform any or all of the functions described herein as being performed by any of a user, a cache, or server described herein will now be discussed below. For example, the memory unit 256 may store a program including executable instructions corresponding to any or all of the operations described herein with reference to FIGS. 1-3 as being performed by a user, a cache, or server. According to at least one example embodiment, additionally or alternatively to being stored in the memory unit 256, the executable instructions may be stored in a computer-readable medium including, for example, an optical disc, flash drive, SD card, etc., and the network element 251 may include hardware for reading data stored on the computer readable-medium. Further, the processing unit 258 may be a processor configured to perform any or all of the operations described herein with reference to FIGS. 1-3 as being performed by a user, a cache, or server, for example, by reading and executing the executable instructions stored in at least one of the memory unit 256 and a computer readable storage medium loaded into hardware included in the network element 251 for reading computer-readable mediums.

Examples of the network element 251 being programmed, in terms of hardware, to perform any or all of the functions described herein as being performed by a user, a cache, or server will now be discussed below. Additionally or alternatively to executable instructions corresponding to the functions described with reference to FIGS. 1-3 as being performed by a user, a cache, or server being stored in a memory unit or a computer-readable medium as is discussed above, the processing unit 258 may include a circuit that has a structural design dedicated to performing any or all of the operations described herein with reference to FIGS. 1-3 as being performed by a user, a cache, or server. For example, the above-referenced circuit included in the processing unit 258 may be a FPGA or ASIC physically programmed to perform any or all of the operations described with reference to FIGS. 1-3 as being performed by a user, a cache, or server.

An overview of hierarchical caching according to one or more example embodiments will now be discussed below.

Overview of Hierarchical Caching According to One or More Example Embodiments

With respect to many conventional caching algorithms, some of the impediments to practical use may have been a perceived complexity of implementation of the algorithms which can impede throughput performance and an expectation that the value of additional caching performance gains such as increased hit-rate may be outweighed by factors such as ability to adapt to asset popularity changes.

One or more example embodiments use new caching algorithms for online video. The new caching algorithms have low implementation complexity; and have improved hit-rate and replacement rate. The new caching algorithms have been evaluated based on simulations that involve typical popularity of assets and realistic changes using video on-demand (VoD) statistics. Some studies have indicated that many assets are quite popular in the beginning of their lifecycle, but drop in popularity at an exponential rate and are a fraction of their popularity within days after their introduction. Based on these, not only hit-rate, but also byte bit-rate and replacement rate are used to evaluate caching algorithms according to one or more example embodiments. Though one or more example embodiments of caching algorithms are described herein with reference to caching online video, one or more example embodiments described herein for caching online video may also apply to other types of media transferred through communications networks like the internet including, for example, audio, pictures, video games, and 3-D objects and models.

Example Method of Providing Hierarchical Caching According to One or More Example Embodiments A method of providing hierarchical caching according to one or more example embodiments will now be discussed with respect to FIG. 3 and with reference to examples in which online video data is being cached by the CDN 130 of FIG. 1. According to one or more example embodiments, the method of providing hierarchical caching illustrated in FIG. 3 is based on a hierarchical cache, like that shown in FIG. 2A, rather than a horizontally cooperative cache, because hierarchical caches may be more efficient for operator networks.

According to one or more example embodiments, a method of providing hierarchical caching uses a caching algorithm that works in a local manner in a given cache without the need for global information. Further, according to one or more example embodiments, a method of providing hierarchical caching uses a caching algorithm that is an O(1) algorithm with respect to the number of assets or nodes.

According to one or more example embodiments, a method of providing hierarchical caching uses a caching algorithm that is relatively quick to respond to changes in popularity when previously very popular assets drop their value quickly.

According to one or more example embodiments, a method of providing hierarchical caching uses a caching algorithm that provides improved hit-rate performance.

According to one or more example embodiments, a method of providing hierarchical caching uses a caching algorithm that does not use the size of an asset in the decision to evict as this may cause undesirable behaviour for online video.

According to one or more example embodiments, a method of providing hierarchical caching uses a caching algorithm that runs at each cache in a given hierarchy independent of the algorithm in other caches. Each cache estimates the inter-arrival time of each asset locally. Each cache also calculates its own characteristic time, which is defined as the average time an asset stays in cache before it is evicted. For example the characteristic time of a cache may be determined by the cache in accordance with known method using LRU, by determining the average of several eviction times corresponding to several assets where, for each asset, the eviction time for that asset may be determined when the cache is about to evict an asset, as the difference between the current time and the time that asset was last requested. One or more example embodiments of the above-referenced caching algorithm will now be discussed in greater detail below.

According to one or more example embodiments, a method of providing hierarchical caching uses a caching algorithm that evicts assets in accordance with the known LRU scheme. For example, according to one or more example embodiments, once the caching algorithm determines an asset is to be evicted form a cache, the asset selected for eviction is the least recently used asset.

Table 1 below describes variables that are defined for each asset.

TABLE 1

| | |
|---|---|
| i | Asset Number from 0 to N. |
| j | Cache number in a given level of hierarchy from 0 to P. |
| k | Cache hierarchy level from 0 to M, higher number is higher in hierarchy. |
| $T_{ijk}$ | Average inter-arrival time of asset i for cache j in hierarchy k. |
| $P_{ijk}$ | Previous time asset i was seen in cache j in hierarchy k. |

Table 2 below describes variables that are defined for each cache.

TABLE 2

| | |
|---|---|
| $TC_{jk}$ | Characteristic time of cache j in hierarchy k. |
| $PL_{jk}$ | Last time this asset was seen in cache j in hierarchy k. This is part of the LRU function which leaves a timestamp for the last time request for an asset was seen in a cache. |
| TS | Current time. |

Table 3 below describes variables that are defined for the whole cache hierarchy.

TABLE 3

| | |
|---|---|
| $W_{TC}$ | Weight for the exponential moving average for the characteristic time. Example values include 0.01-0.05. |
| $W_{IA}$ | Weight for the exponential moving average for the inter-arrival times. Example values include 0.01-0.05. |
| GS | Gentle slope parameter on how quickly $TC_{jk}$ is increased over time. Example values include 0.001-0.0001. |

Table 4 below describes initial conditions that, according to one or more example embodiments, are set before the caching algorithm used by the method of providing hierarchical caching illustrated in FIG. 3 is run.

TABLE 4

| | |
|---|---|
| $P_{ijk}$ | Set all to the current time. |
| $T_{ijk}$ | Set all to a large number, but smaller than the number used for initial value for the characteristic times $TC_{jk}$. This allows all assets to be cached until $TC_{jk}$ is updated to a real value. An example would set this number 100 times higher than the largest expected inter-arrival time. |
| $TC_{jk}$ | Set all to a large number, larger than the number for $T_{ijk}$. Typically set this at 10 times the $T_{ijk}$ number. |

Equation (1) below illustrates the manner in which $TC_{jk}$, the characteristic time value of a cache (j,k), is calculated.

$$TC_{jk}=w_{TC}\times(TS-P_{ijk})+(1-w_{TC})\times TC_{jk} \quad (1)$$

Equation (1) calculates the characteristic time $TC_{jk}$ as an exponential moving average of times assets stay in cache (j,k) without being requested before being evicted from the cache (j,k), for example, in accordance with an LRU cache eviction policy. For example, the characteristic time $TC_{jk}$ as an exponential moving average of times between receipt last requests for assets in cache (j,k) and eviction of the assets from cache (j,k). According to one or more example embodiments, in accordance with known LRU methods for operating caches, the value $P_{ijk}$ is updated to the current time whenever a cache receives a request for the $i^{th}$ asset by the LRU function itself.

Equation (2) below illustrates the manner in which the average inter-arrival time of asset i for a cache (j,k), $T_{ijk}$, is calculated. According to one or more example embodiments, the value $T_{ijk}$ may be calculated whenever an asset is requested from any cache, whether it is a leaf cache or a higher layer cache.

$$T_{ijk}=w_{IA}\times(TS-P_{ijk})+(1-w_{IA})\times T_{ijk} \quad (2)$$

Equation (2) calculates an exponential moving average of the inter-arrival time of asset i using the weight $w_{IA}$.

According to one or more example embodiments, after calculating the value $TC_{jk}$ in accordance with equation (1), the characteristic time $TC_{jk}$ is gently increased so that the characteristic time $TC_{jk}$ does not get stuck at a low number. The characteristic time $TC_{jk}$ is gently increased in accordance with equation (3) below.

$$TC_{jk}=TC_{jk}+GS\times(TS-PL_{jk}) \quad (3)$$

According to one or more example embodiments, after gently increasing the value $TC_{jk}$ in accordance with equation (3), the current value for $PL_{jk}$ is set to the current time as is illustrated by equation (4) below.

$$PL_{jk}=TS \quad (4)$$

An example of a caching algorithm used by the method of providing hierarchical caching according to one or more example embodiments is described below in the form of pseudo code by algorithm 1. According to one or more example embodiments, algorithm 1 may be performed, individually, by each cache in the hierarchical tree structure of CDN 130. For example, every time a cache from among the caches of the CDN 130 receives a request for an asset i, the cache may perform Algorithm 1 to determine if the requested asset needs to be cached by the cache.

| Algorithm 1 |
|---|
| Update asset counts $T_{ijk}$; as defined earlier |
| If (asset already in cache) begin |
|    Deliver asset i to client or lower layer cache |
|    Update LRU Database ($P_{ijk}$) with timestamp for that asset |
| end |
| else if ($T_{ijk}$ < $TC_{ijk}$) begin |
|    Request asset i from upstream cache or origin |
|    Deliver asset i to client or lower layer cache |
|    Store asset i in the local cache |
| end |
| else begin |
|    Request asset i from upstream cache or origin |
|    Deliver asset i-note here we do not store this asset |
| end |

An example use of Algorithm 1 will be discussed in greater detail below with respect to FIG. 3. FIG. 3 is a flow chart illustrating an example method of operating a network element to perform hierarchical caching of online media. FIG. 3 will be explained from the perspective of cache 135B which, as is explained above with reference to FIG. 2A, corresponds to cache (0,1) in FIG. 2A (i.e., the $0^{th}$ cache in hierarchy level k=1).

Referring to FIG. 3, in step S305, a request for an asset is received at the cache. For example, in step S305, the cache 135B receives a request for an asset x. The cache 135B may receive the request for the asset x from one of the children caches of cache 135B (i.e., as is illustrated in FIG. 2A, the cache 135B is the parent to caches 135D and 135E, which correspond to cache (0,0) and cache (1,0) illustrated in FIG. 2A, respectively). The method shown in FIG. 3 will be explained with reference to an example where the cache 135B receives a request for the asset x from the cache 135D. For example, the cache 135D may send a request for the asset x to cache 135B in response to receiving, at the cache 135D, a request for the asset x from the end user 110. Accordingly, when the method shown in FIG. 3 is performed by the cache 135B when receiving a request for an asset x, i=x, j=0, and k=1.

As is shown in Algorithm 1, upon receiving the request for the asset x in step S305, the cache 135B may calculate the value $T_{ijk}$ using equation (2). Next the cache may set the value for $P_{ijk}$ as the current time. Next, the cache 135B may proceed to step S310. Whenever the cache 135B evicts an asset, it may calculate the value $TC_{jk}$ using equation (1) and then the cache 135B may gently increase the value $TC_{jk}$ using equation (3).

In step S310, the cache determines whether or not the asset for which the request was received in step S305 is stored (i.e., cached) in the cache. For example, in step S310, the cache 135B may determine whether the asset x is already cached in the cache 135B. If the asset the asset x is currently stored in the cache 135B, then the cache 135B proceeds to step S315.

In step S315, the cache provides the asset requested in step S305 and updates the LRU database of the cache. For example, in step S315, the cache 135B may provide the asset x to the network element that requested the asset in step S310, the cache 135D. Further, in accordance with known LRU methods of operating a cache, the cache 135D may update an LRU database within the cache 135D (e.g., within the memory 256 of the cache 135D) that stores timestamps indicating, respectively, times of the most recent uses of each the assets presently stored in the cache.

Returning to step S310, if the cache determines in step S310 that the asset requested in step S305 is not included in the cache, the cache proceeds to step S320. For example, if, in step S310, the cache 135B determines that the asset x is not currently stored in the cache 135B, then the cache 135B proceeds to step S320.

In step S320, the cache retrieves the asset requested in step S305. For example, in step S320, the cache 135B may send a request for the asset x to the parent of the cache 135B, cache 135A. In response to the request sent by the cache 135B, the cache 135B may receive the asset x from the cache 135A. For example, the cache 135A may be storing the asset x already, or the cache 135A may retrieve the asset x from the origin server 140 before providing the asset x to the cache 135B.

Next, in step S325, the cache performs a comparison based on the values $TC_{jk}$ and $T_{ijk}$ and determines whether or not to store the asset x based on the comparison. For example, in step S325, the cache 135B may compare the value $TC_{jk}$ to the value $T_{ijk}$ in accordance with equation (5) below.

$$(T_{ijk} < TC_{jk}) \quad (5)$$

If the result of the comparison operation in step S325 is true, the cache 135B may proceed to step S335 before proceeding to step S330. In step S335, the cache 135B stores the asset x in the cache 135B. In step S330, the cache 135B provides the asset to the network element that requested the asset, cache 135D.

If the result of the comparison operation in step S325 is false, the cache 135B may proceed directly to step S330 without proceeding to step S335. Accordingly, if the result of the comparison operation in step S325 is false, the cache 135B may provide the asset x to the cache 135D without caching the asset x in the cache 135B. Thus, according to one or more example embodiments, caches in the CDN 130 may determine whether or not to cache a retrieved asset in accordance with the comparison defined by equation (5).

After providing the requested asset x in step S330, the cache 135B returns to step S305 to await receipt of the next asset request.

Though FIG. 3 is explained from the perspective of the cache 135B, the operations discussed above with respect to the cache 135B may be performed by any cache in the CDN 130. For example, all caches in the CDN may perform the operations discussed above with respect to the cache 135B concurrently.

A new database, which may be included in caches of the CDN 130 (e.g., within the memories 256 of the caches of the CDN 130) in addition to the LRU databases of the caches, will now be discussed below.

Large Asset Inter-arrival Time Database

As is discussed above, caches of the CDN 130 may include LRU databases in accordance with known LRU methods for operating caches. Further, each of the caches of the CDN 130 may also include a database for storing inter-arrival times of various assets for example, for calculating the average inter-arrival of asset i, $T_{ijk}$.

Given that the number of assets in a library can be very large, sometimes much larger than the number of assets that can be stored in a cache, it may be desirable to use more than one database to store the inter-arrival time statistics. For example, according to one or more example embodiments, the caches of the CDN 130 may include a main database of inter-arrival times and an additional database of inter-arrival times. In accordance with one or more example embodiments, the main database of inter-arrival times for a cache does not contain inter-arrival times that are more than a few times the $TC_{jk}$ value for that cache; for example 3 times. According to one or more example embodiments, the exact value above which inter-arrival times are not included in the main inter-arrival time data base may be based on the popularity distribution of assets stored at that cache.

The additional database may be a "one occurrence" database that is used to store assets which have seen only a single request so far and assets that are demoted from the main inter-arrival time database. For example, when a cache sees a second request for an asset, the cache may calculate an inter-arrival time based on the timings of the first and second requests, and the cache may place that asset into the main inter-arrival time database based on the newly calculated inter-arrival time. Further, upon placing asset which has the newly calculated inter-arrival time into the main database, the asset with the largest inter-arrival time in the main database may be removed from the main database. In order to return to the main database, the removed asset may need to enter the "one occurrence" database first, and then be promoted to the main inter-arrival database in the manner discussed above.

The additional database may be a "one occurrence" database that is used to store assets which have seen only a single request so far. When the cache sees a second request for an asset in the "one occurrence" database, the cache may calculate an inter-arrival time based on the timings of the first and second requests, then the cache may place that asset into the main inter-arrival time database based on the newly calculated inter-arrival time while also deleting that entry from the "one occurrence" database. Further, upon placing asset which has the newly calculated inter-arrival time into the main database, the asset that was the least recently used in the main database may be removed from the main database. Least recently used means the asset whose last request was the oldest among all assets. In order to return to the main database, the removed asset may need to enter the "one occurrence" database first, and then be promoted to the main inter-arrival database in the manner discussed above.

Figure 4:
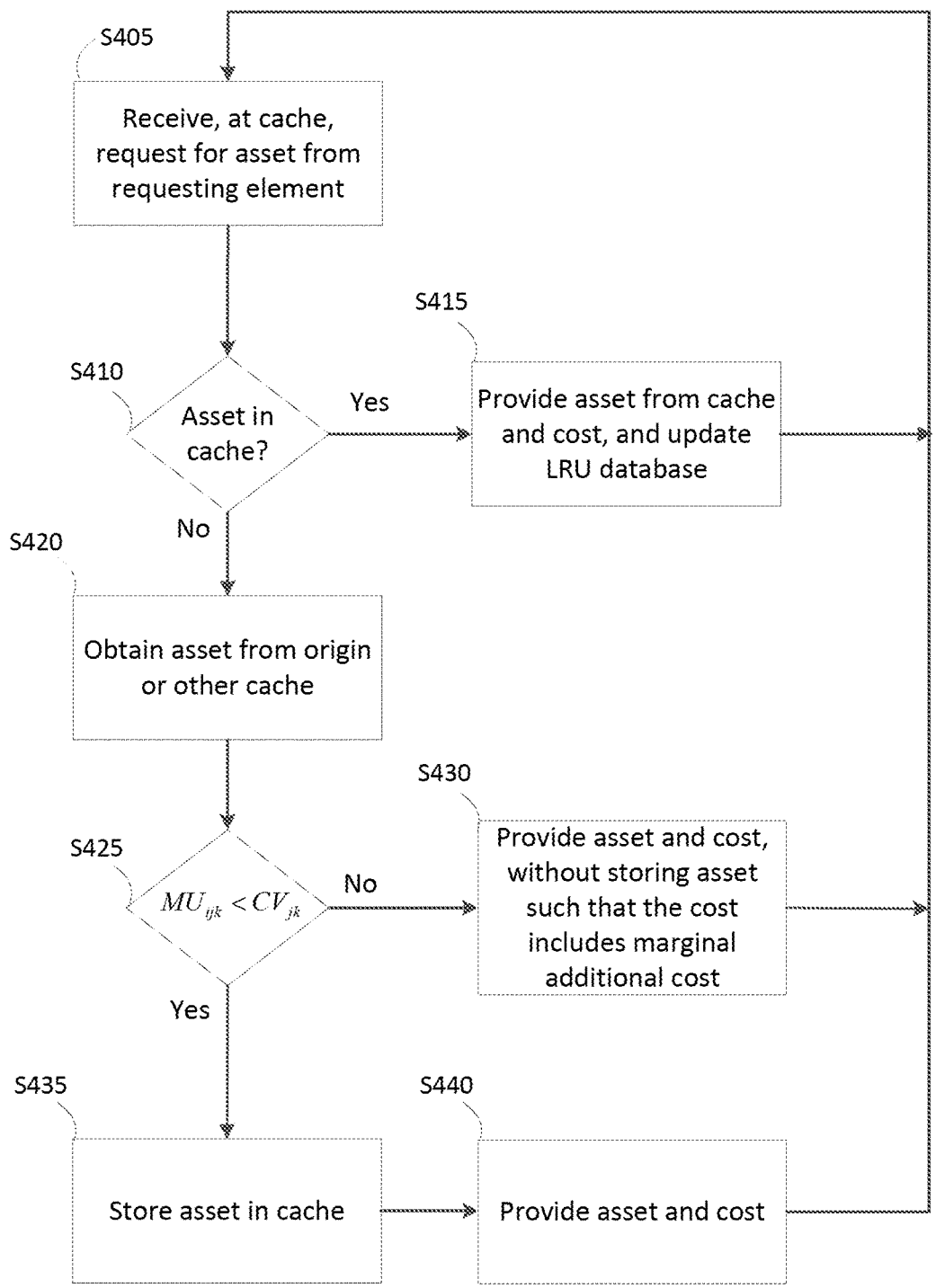
FIG. 4 is a flow chart illustrating an example method of operating a network element to perform hierarchical caching of online media according to other example embodiments.

FIG. 4 is a method of operating a network element to perform hierarchic caching of online media according to other example embodiments. [A1]

Table 5 below describes additional variables for the cost function that are defined for each asset.

TABLE 5

| | |
|---|---|
| $CV_{jk}$ | Characteristic marginal value of cache j in hierarchy k. |
| $C_{ijk}$ | The current cost of asset i in cache j in hierarchy k |
| $MV_{ijk}$ | The marginal value of asset i in cache j in hierarchy k |
| $MU_{ijk}$ | The exponential moving averages of marginal value of asset i in cache j in hierarchy k |
| $C\text{-out}_{ijk}$ | The cost of asset i in cache j in hierarchy k sent from origin or upstream cache |
| $C\text{-in}_{ijk}$ | The cost of asset i in cache j in hierarchy k sent to downstream cache |
| $C\text{-sto}_{ijk}$ | The marginal value of asset i in cache j in hierarchy k |
| TS | Current time. |

As discussed below, in other example embodiments, the caches in the CDN 130 may perform Algorithm 2 when receiving a request for an asset.

---

Algorithm 2

Update asset counts $T_{ijk}$; as defined earlier
If (asset already in cache) begin
    Deliver asset i and cost $C_{out,ijk}$ of asset i to client or lower layer cache,
    Update LRU Database ($P_{ijk}$) with timestamp for that asset;
    end
else if ($MU_{ijk} < CV_{jk}$) begin
Request asset i from upstream cache or origin
    Deliver asset i and cost $C_{out,ijk}$ of asset i to client or lower layer cache
    Store asset i in the cache, where the storage includes evicting a currently stored asset if the cache is full.
    end
    else begin
    Request asset i from upstream cache or origin
    Deliver asset I and cost $C_{out,ijk}$ of asset i to client or lower layer cache, where the cost $C_{out,ijk}$ includes an additional marginal cost $C_{sto,ijk}$ due to the asset I not being stored locally
    end

---

Algorithm 2 will be explained with reference to FIG. 4, from the perspective of cache 135B which, as explained above with reference to FIG. 2A, corresponds to cache (0,1) in FIG. 2A (i.e., the 0th cache in hierarchy level k=1).

Referring to FIG. 4, in operation S405, the cache receives a request for an asset. For example, the cache 135B may receive the request for the asset x from one of the children caches of cache 135B (i.e., as is illustrated in FIG. 2A, the cache 135B is the parent to caches 135D and 135E, which correspond to cache (0,0) and cache (1,0) illustrated in FIG. 2A, respectively).

Hereinafter, for the sake of explanation, it is assumed that cache 135B receives a request for the asset x from the cache 135D, for example, in response to cache 135D receiving a request for the asset x from the end user 110. Therefore, from the point of view of cache 135B receiving a request for asset x, i=x, j=0, and k=1.

As is shown in Algorithm 2, the cache 135B may calculate the exponential moving averages of the marginal value $MU_{ijk}$ using Equation (7). Next the cache may set the value for $P_{ijk}$ as the current time.

In operation 5410, the cache 135B may determine whether or not the asset x is stored (i.e., cached) in the cache 135B. If the cache 135B determines that the asset x is currently stored in the cache 135B, then the cache 135B may proceed to operation S415, otherwise the cache 135B may proceed to operation S420.

In operation S415, the cache 135B provides the asset x to cache 135D and updates the LRU database of the cache in accordance with known least recently used (LRU) methods. For example, the cache 135D may update an LRU database within the cache 135D (e.g., within the memory 256 of the cache 135D) that stores timestamps indicating, respectively, times of the most recent uses of each the assets presently stored in the cache. Further the cache 135B provides the cost $C_{out,ijk}$ of the asset i=x to cache 135D where the cost $C_{out,ijk}$ equals the current cost $C_{ijk}$ associated with the asset i.

In some example embodiments, the cost may represent the number of hops (numbers of caches) the asset has passed before being stored in the cache. In other example embodiments the cost may represent the latency the asset has encountered before being stored in the cache. In still other example embodiments, the cost may represent a combination of metrics, for example, both the number of hops and the latency encountered.

If the cache 135B determines in operation S410 that the asset x is not stored therein, the cache 135B proceeds to operation S420.

In operation S420, the cache 135B retrieves the asset x from the origin or another one of the caches. For example, the cache 135B may send a request for the asset x to the parent of the cache 135B, cache 135A. In response to the request sent by the cache 135B, the cache 135B may receive the asset x from the cache 135A. For example, the cache 135A may be storing the asset x already, or the cache 135A may retrieve the asset x from the origin server 140 before providing the asset x to the cache 135B.

In operation S425, the cache 135B determines whether to store the asset x based on a comparison between the moving average of the marginal value $MU_{ijk}$ associated with the asset i=x and the characteristic marginal value $CV_{jk}$ of the cache 135B.

For example, the cache 135B may compare the value $MU_{ijk}$ to the value $CV_{jk}$ in accordance with Equation (6) below.

$$(MU_{ijk} < CV_{jk}) \qquad (6)$$

The cache 135B may calculate the characteristic marginal value $CV_{jk}$ using Equation (7). The cache 135B may recalculate the value of the characteristic marginal value $CV_{jk}$ only when the cache 135B is full and one of the previously stored assets needs to be evicted to make room for the asset x. The cache 135B may store the updated value of the characteristic marginal value $CV_{jk}$.

$$CV_{jk} = \frac{TC_{jk}}{C_{ijk}} = w_{TC} \times \frac{(TS - P_{ijk})}{C_{ijk}} + (1 - w_{TC}) \times CV_{jk} \qquad (7)$$

As illustrated in Equation 7, the characteristic marginal value is equal to the characteristic time value $TC_{jk}$ determined in Equation 1 divided by the cost $C_{ijk}$ of asset i to cache (j,k). Therefore, when evicting an asset i from cache (j,k), if the cost $C_{ijk}$ associated with obtaining the asset i is high, the characteristic marginal value $CV_{jk}$, which represents a cost conscious average period of time assets stay in a cache (j,k) without being requested before eviction, will be low.

Further, the cache 135B may calculate the exponential moving averages of the marginal value $MU_{ijk}$ of the asset i=x using Equation (8) below.

$$MU_{ijk} = \frac{T_{ijk}}{C_{ijk}} = w_{IA} \times \frac{(TS - P_{ijk})}{C_{ijk}} + (1 - w_{IA}) \times MU_{ijk} \qquad (8)$$

The cache 135B may calculate the marginal value $MU_{ijk}$ for each asset i retrieved by the cache 135B, and may recalculate the marginal value $MU_{ijk}$ of a stored asset i when one of the stored assets i is requested.

As illustrated in Equation 8, the exponential moving averages of the marginal value $MU_{ijk}$ is equal to the average the inter-arrival time of asset $T_{ijk}$ divided by the cost $C_{ijk}$ of asset i to cache (j,k).

If the cache 135B determines, using Equations 6 to 8, that the moving average of the marginal value $MU_{ijk}$ associated with the asset i=x is not less than the characteristic marginal value $CV_{jk}$ of the cache 135B, the cache 135B may proceed to operation S430.

In operation S430, if the moving average of the marginal value $MU_{ijk}$ associated with the asset i=x is not less than the characteristic marginal value $CV_{jk}$ of the cache 135B, the cache 135B provides the asset to the network element that requested the asset, cache 135D. Further, the cache 135B provides the cost $C_{out,ijk}$ of the asset i=x to cache 135D where, due to the cache 135B not storing the asset x, the cost $C_{out,ijk}$ includes an additional marginal cost C-sto$_{ijk}$ indicating the cost of cache 135B retrieving the asset x if cache 135D decides to evict the asset at a later time period.

In operation S435, if the cache 135B determines, using Equations 6 to 8, that the moving average of the marginal value $MU_{ijk}$ associated with the asset i=x is less than the characteristic marginal value $CV_{jk}$ of the cache 135B, the cache 135B may store the asset x in the cache 135B and proceed to operation S440.

When the cache 135B stores the asset x therein, since the size of the cache 135B may be definite, the cache 135B may require eviction of a currently stored asset to generate space to store the asset x.

For example, the cache 135B may determine which asset to evict based the largest marginal value $MV_{ijk}$ of the stored assets i.

For example the cache 135B my utilize Equation 9 below to determine the marginal value $MV_{ijk}$ of the assets i, and evict the asset with the largest marginal value $MV_{ijk}$.

$$MV_{ijk} = \frac{(TS - P_{ijk})}{C_{ijk}} \qquad (9)$$

As illustrated in Equation 9, if the cost $C_{ijk}$ associated with the asset i is relatively high, then the marginal value $MV_{ijk}$ of the asset i will be relatively low, and, therefore, that asset i will likely not be evicted due to the high costs associated with re-obtaining that asset i.

Thus, according to one or more example embodiments, caches in the CDN 130 may determine whether or not to cache a retrieved asset in accordance with the comparison defined by equation (6) such that the determination of whether to cache an asset is based on the cost associated with retrieving that asset. Further, the cache 135B may determine which asset to evict to make space for the stored asset in consideration of the cost of obtaining each of the assets i.

In operation S440, the cache 135B may provide the asset x to cache 135D. Further the cache 135B provides the cost $C_{out,ijk}$ of the asset i=x to cache 135D where the cost $C_{out,ijk}$ equals the current cost $C_{ijk}$ associated with the asset i.

After providing the requested asset x in operations S415, S430 and S440, the cache 135B returns to operation S405 to await receipt of the next asset request.

Example embodiments being thus described, it will be obvious that embodiments may be varied in many ways. Such variations are not to be regarded as a departure from example embodiments, and all such modifications are intended to be included within the scope of example embodiments.

I claim:

1. A method of operating a first cache device, the method comprising:
   receiving, at the first cache device, a request to send a first asset to a second device;
   determining whether the first asset is stored at the first cache device; and
   when the determining determines that the first asset is not stored at the first cache device,
      obtaining, by the first cache device, the first asset,
      calculating, by the first cache device, a cost associated with the first asset,
      selectively storing the first asset at the first cache device based on a moving average of a marginal value of the first asset with respect to the first cache device and a characteristic marginal value of the first cache device, the characteristic marginal value of the first cache device representing a cost conscious average period of time between receipt of last requests for, and eviction of, assets cached at the first cache device, and
      sending the first asset and the calculated cost from the first cache device to the second device.

2. The method of claim 1, wherein the first cache device is one of a plurality of cache devices of a content distribution network divided into a plurality of hierarchy levels, and the method further comprises:
   for each of the plurality of cache devices,
      determining a moving average of the marginal value of a requested asset, when a request for the requested asset is received by a respective one of the plurality of cache devices, and
      determining a characteristic marginal value associated with a respective one of the plurality of cache devices, when the cache device evicts an asset.

3. The method of claim 2, wherein the obtaining obtains the first asset and an obtained cost associated therewith from a higher level of the plurality of hierarchy levels, and the calculating the cost includes adding a marginal cost to the obtained cost if the selectively storing does not store the first asset.

4. The method of claim 1, further comprising:
   determining the characteristic marginal value of the first cache device by,
      initializing the characteristic marginal value of the first cache device as an initialized characteristic marginal value which is higher than an initialized value of the moving average of the marginal value of the first asset with respect to the first cache device, and
      updating the characteristic marginal value of the first cache device based on exponentially weighted moving average of periods of time between receipt of last requests for, and eviction of, assets cached at the first cache device and the cost associated with the assets, in accordance with a least recently used cache eviction policy.

5. The method of claim 4, wherein the updating the characteristic marginal value of the first cache device further includes,
gently increasing the characteristic marginal value of the first cache device, when the first cache device evicts an asset.

6. The method of claim 4, further comprising:
determining the moving average of the marginal value of the first asset with respect to the first cache device by,
initializing the moving average of the marginal value of the first asset with respect to first cache device as a value lower than the initialized characteristic marginal value of the first cache device, and
updating the moving average of the marginal value of the first asset with respect to the first cache device based on exponentially weighted moving average of periods of time between consecutive receipts of requests for the first asset and the cost associated with the first asset, at the first cache device, the requests requesting the first cache device to send the first asset to another device.

7. The method of claim 1, wherein the selectively storing includes,
assigning the first asset to a first database, when an initial request for the first asset is received at the first cache device; and
when a second request is received consecutively with respect to the initial request,
determining an inter-arrival time of the first asset based on times at which the initial request and the second request were received at the first cache device, and
if a number of assets stored in an inter-arrival database is greater than or equal to a threshold then,
determining a second asset to remove from an inter-arrival database based on which of a plurality of assets stored in the inter-arrival database has a largest marginal value associated therewith that decreases as the cost associated with the second asset increases, the inter-arrival database storing arrival times of requests corresponding to assets, the inter-arrival database being different than the first database, and
removing the second asset from the inter-arrival database; and
assigning the first asset to the inter-arrival database.

8. The method of claim 7, further comprising:
determining the marginal value of the assets by dividing a last requested time of each of the plurality of assets by the cost associated therewith.

9. The method of claim 1, wherein the cost associated with the first asset represents one or more of a number of hops between a source of the first asset and the first cache device and a latency the first asset encountered therebetween.

10. A first cache device comprising:
a processor and a memory, the memory containing computer readable code that, when executed by the processor, configures the processor to,
receive a request to send a first asset to a second device, determine whether the first asset is stored at the first cache device, and
when the processor determines that the first asset is not stored at the first cache device, the processor is configured to,
obtain, by the first cache device, the first asset,
calculate, by the first cache device, a cost associated with the first asset,
selectively store the first asset at the first cache device based on a moving average of a marginal value of the first asset with respect to the first cache device and a characteristic marginal value of the first cache device, the characteristic marginal value of the first cache device representing a cost conscious average period of time between receipt of last requests for, and eviction of, assets cached at the first cache device, and
send the first asset and the calculated cost from the first cache device to the second device.

11. The first cache device of claim 10, wherein,
the first cache device is one of a plurality of cache devices of a content distribution network divided into a plurality of hierarchy levels, each of the plurality of cache devices having a processor associated therewith, and
each one of the plurality of cache devices is configured to,
determine a moving average of the marginal value of a requested asset,
when a request for the requested asset is received by a respective one of the plurality of cache devices, and
determine a characteristic marginal value associated with a respective one of the plurality of cache devices, when the cache device evicts an asset.

12. The first cache device of claim 11, wherein the processor is configured to obtain the first asset and an obtained cost associated therewith from a higher level of the plurality of hierarchy levels, and calculate the cost by adding a marginal cost to the obtained cost if the processor determines not to store the first asset.

13. The first cache device of claim 10, wherein the processor is configured to determine the characteristic marginal value of the first cache device by,
initializing the characteristic marginal value of the first cache device as an initialized characteristic marginal value which is higher than an initialized value of the moving average of the marginal value of the first asset with respect to the first cache device, and
updating the characteristic marginal value of the first cache device based on exponentially weighted moving average of periods of time between receipt of last requests for, and eviction of, assets cached at the first cache device and the cost associated with the assets, in accordance with a least recently used cache eviction policy.

14. The first cache device of claim 10, wherein the processor is configured to update the characteristic marginal value of the first cache device by gently increasing the characteristic marginal value of the first cache device, when the first cache device evicts an asset.

15. The first cache device of claim 13, wherein the processor is configured to determine the moving average of the marginal value of the first asset with respect to the first cache device by,
initializing the moving average of the marginal value of the first asset with respect to first cache device as a value lower than the initialized characteristic marginal value of the first cache device, and
updating the moving average of the marginal value of the first asset with respect to the first cache device based on exponentially weighted moving average of periods of time between consecutive receipts of requests for the first asset and the cost associated with the first asset, at the first cache device, the requests requesting the first cache device to send the first asset to another device.

16. The first cache device of claim 10, wherein the processor is configured to selectively store the first asset by,
assigning the first asset to a first database, when an initial request for the first asset is received at the first cache device;
if a number of assets stored in an inter-arrival database is greater than or equal to a threshold when a second request is received consecutively with respect to the initial request then,
determining an inter-arrival time of the first asset based on times at which the initial request and the second request were received at the first cache device, and
determining a second asset to remove from an inter-arrival database based on which of a plurality of assets stored in the inter-arrival database has a largest marginal value associated therewith that decreases as the cost associated with the second asset increases, the inter-arrival database storing arrival times of requests corresponding to assets, the inter-arrival database being different than the first database, and
removing the second asset from the inter-arrival database; and
assigning the first asset to the inter-arrival database.

17. The first cache device of claim 16, wherein the processor is configured to determine the marginal value of the assets by dividing a last requested time of each of the plurality of assets by the cost associated therewith.

18. The first cache device of claim 10, wherein the cost associated with the first asset represents one or more of a number of hops between a source of the first asset and the first cache device and a latency the first asset encountered therebetween.

19. A method of operating a content distribution network, the content distribution network including a plurality of first cache devices, the plurality of first cache devices being divided into a plurality of hierarchy levels, the method comprising:
performing a first caching operation for each of the plurality of first cache devices, respectively, such that, for each one of the plurality of first caching devices divided into the plurality of hierarchy levels, the first caching operation includes,
receiving, by the first cache device, a request to send a first asset to a second device;
determining, by the first cache device, whether the first asset is stored at the first cache device; and
when the determining determines that the first asset is not stored at the first cache device,
obtaining, at the first cache device, the first asset,
calculating a cost associated with the first asset,
selectively storing the first asset at the first cache device based on a moving average of a marginal value of the first asset with respect to the first cache device and a characteristic marginal value of the first cache device, the characteristic marginal value of the first cache device representing a cost conscious average period of time between receipt of last requests for, and eviction of, assets cached at the first cache device, and
sending the first asset and the calculated cost from the first cache device to the second device.

20. The method of claim 19, wherein the obtaining obtains the first asset and an obtained cost associated therewith from a higher level of the plurality of hierarchy levels, and the calculating the cost includes adding a marginal cost to the obtained cost if the selectively storing does not store the first asset.

* * * * *